(12) United States Patent
Khanduja et al.

(10) Patent No.: US 9,189,345 B1
(45) Date of Patent: Nov. 17, 2015

(54) METHOD TO PERFORM INSTANT RESTORE OF PHYSICAL MACHINES

(71) Applicant: EMC Corporation, Hopkinton, MA (US)

(72) Inventors: Vaibhav Khanduja, Cupertino, CA (US); Vladimir Mandic, San Jose, CA (US); Joe Robert Putti, San Jose, CA (US); Rajesh Nair, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 169 days.

(21) Appl. No.: 14/037,259

(22) Filed: Sep. 25, 2013

(51) Int. Cl.
*G06F 11/00* (2006.01)
*G06F 11/14* (2006.01)
*G06F 9/44* (2006.01)

(52) U.S. Cl.
CPC .......... *G06F 11/1464* (2013.01); *G06F 9/4416* (2013.01); *G06F 11/1417* (2013.01)

(58) Field of Classification Search
CPC G06F 9/4416; G06F 11/1417; G06F 11/1464
See application file for complete search history.

(56) References Cited

U.S. PATENT DOCUMENTS

| | | | | |
|---|---|---|---|---|
| 6,738,923 B1* | 5/2004 | Blam et al. | | 714/4.11 |
| 6,931,558 B1* | 8/2005 | Jeffe et al. | | 713/340 |
| 2003/0126242 A1* | 7/2003 | Chang | | 709/222 |
| 2004/0098426 A1* | 5/2004 | Ishii et al. | | 707/204 |
| 2004/0193867 A1* | 9/2004 | Zimmer et al. | | 713/2 |
| 2007/0113062 A1* | 5/2007 | Osburn et al. | | 713/1 |
| 2007/0226538 A1* | 9/2007 | Ban et al. | | 714/13 |
| 2007/0260868 A1* | 11/2007 | Azzarello et al. | | 713/2 |
| 2007/0294566 A1* | 12/2007 | Solyanik | | 714/6 |
| 2008/0126785 A1* | 5/2008 | Chong et al. | | 713/2 |
| 2009/0070626 A1* | 3/2009 | Chen et al. | | 714/7 |
| 2009/0193102 A1* | 7/2009 | Trujillo | | 709/220 |
| 2009/0217079 A1* | 8/2009 | Liu et al. | | 714/4 |
| 2010/0257346 A1* | 10/2010 | Sosnosky et al. | | 713/2 |
| 2012/0072989 A1* | 3/2012 | Sakai et al. | | 726/24 |
| 2014/0172783 A1* | 6/2014 | Suzuki et al. | | 707/609 |
| 2014/0195791 A1* | 7/2014 | Teli et al. | | 713/2 |
| 2014/0195848 A1* | 7/2014 | Teli et al. | | 714/15 |

OTHER PUBLICATIONS

Author Unknown, HP PCI-X Fabric Adapters Support, Network Boot F12, printed Sep. 24, 2013.

* cited by examiner

*Primary Examiner* — Joshua P Lottich
(74) *Attorney, Agent, or Firm* — Van Pelt, Yi & James LLP

(57) ABSTRACT

A method of performing data restore includes connecting, using a boot capable network communication interface, to a backup server over a data network, the backup server having stored thereon a block based backup data volume; accessing the block based backup data volume via the data network as a remotely readable storage resource; and using operating system data read from the block based backup data volume to perform a network boot operation.

19 Claims, 4 Drawing Sheets

METHOD TO PERFORM INSTANT RESTORE OF PHYSICAL MACHINES

BACKGROUND OF THE INVENTION

The contents and data of computer systems or information systems can be lost after a data loss event. Therefore, backup is important for ensuring recovery of the data of the computer systems or information systems in the case of corruption, data loss, or disaster. It is desirable for computer files and data stored on a file server or a workstation to be backed up periodically by a backup and recovery system, so that the computer files and data may be restored after a data loss event.

In the event of a hardware failure, such as a server malfunction, a system administrator may need to perform disaster recovery or bare metal recovery using the backup media. That is, in some situations, the server is so damaged that the machine cannot be booted up or the machine no longer has a working operating system and the server must be restored from "bare metal." Conventional disaster recovery or bare metal recovery process is burdensome and time consuming. The data recovery process can be even more challenging when the size of the backup data is large, such as when the back up data belongs to a data center. In the event of a disaster or catastrophic hardware failure, the system administrator must be able to restore the backup data and bring the system up in operating condition quickly. Therefore, data restore or recovery method that can shorten the recovery time is desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a data recovery method to perform instant restore of a physical machine exposes a network-connected backup medium to the physical machine as a boot-capable disk to enable the physical machine to be booted up using a block based backup data volume over the network. In this manner, when a physical machine, such as a server, suffers from a catastrophic failure, the physical machine can be brought up to a functional level using the network connected backup medium within a short recovery time window.

Figure 1:
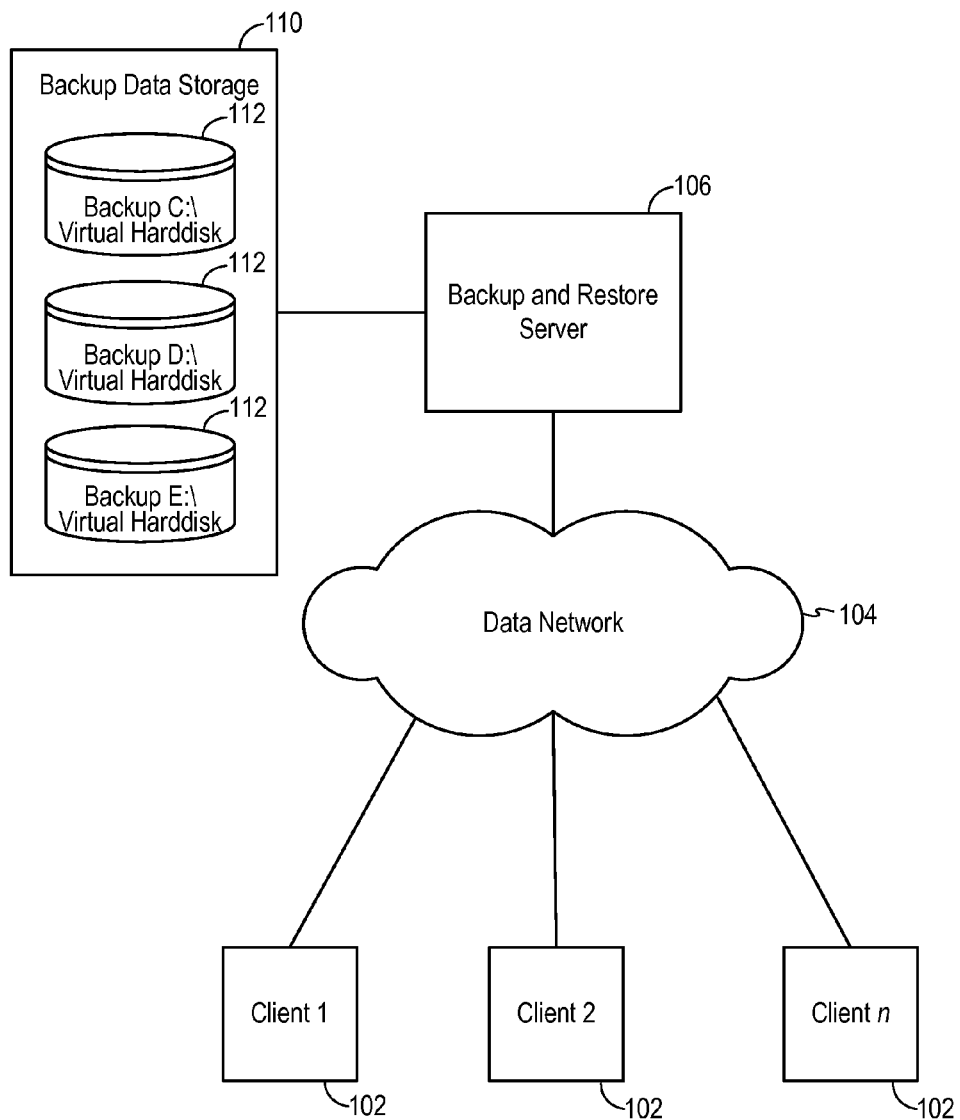
FIG. 1 is a block diagram in which a group of client devices can be backed up by a backup and restore system in some embodiments of the present invention.

FIG. 1 is a block diagram in which a group of client devices can be backed up by a backup and restore system in some embodiments of the present invention. As shown in FIG. 1, a client device 102 (e.g., client 1) is connected to other client devices, servers, or other elements via a data network 104. Data network 104 may include a dedicated communication link, one or more networks, a local area network, a wide area network, a storage area network, the Internet, a wired network, a wireless network, and the like. In the present description, client devices 102 are physical machines representative of computing devices deployed in an environment. Client devices 102 may include desktop computers, laptop computers, workstations, mainframe computers, servers or any other computing devices that include storage media for storing data, including hard disk drives, floppy disks, optical discs, flash memory, and the like. File systems may be used on client devices 102 to organize data in an efficient manner and to maintain the physical locations of the computer files that are stored on the client devices.

The contents and data stored in client devices 102 can be lost after a data loss event. For example, the contents and data of the client devices 102 may be accidentally deleted by end-users, intentionally corrupted by malicious efforts of outsiders, or destroyed by a hardware failure, or destroyed a disaster, such as a fire or earthquake. Therefore, the contents and data of the client devices 102 should be backed up periodically, such that they may be restored after a data loss event.

As shown in FIG. 1, a backup and restore server 106 is connected to client devices 102 via the data network 104. A system administrator or a user may configure backup and restore server 106 to periodically backup the contents and data of a particular client device 102 into a backup data storage 110. Backup data storage 110 may include hard disks, solid state storages, virtual tape libraries (VTL), magnetic tapes, and the like. In some embodiments, the backup and restore server 106 performs backup related functionality such as managing data backup and also manages the retrieval of stored data from the backup data storage 110 during restoration. In some embodiments, during a backup, an entire file system mounted on a client device 102 is backed up by a single process running as a client on the client device 102. For example, the process may read all the directories and files on the file system, process the data contained in the directories and files, and then save the backup data into backup data storage 110. The client devices 102 may communicate with the backup data storage 110 directly through the data network 104 or through the backup and restore server 106. In other embodiments, the client devices 102 may communicate with the backup data storage 110 through a storage node interface. The network configuration topography and/or the number of components in the backup and restore system may vary from the example shown in FIG. 1.

In embodiments of the present invention, the backup and restore server 106 implements block based backup. In some embodiments, a block based backup process performs backup of files or other data objects on a storage disk of the client device by reading blocks of data directly from the disk and storing the blocks of data in the backup data storage. The underlying file system and the operating system on the client device are also backed up and stored in the backup data storage. After a full backup is obtained, the block based backup process may perform incremental backups where blocks and associated metadata are updated when changes are made to the file system since the last backup. During restoration, a volume of data blocks and metadata information are retrieved from the backup media in order to restore the files or data objects to the client device.

In some embodiments, the backup and restore server 106 stores the backup data in the backup data storage 110 in a file format, as an image of the disk. In one embodiment, the backup data is stored using a virtual harddisk file format. The virtual harddisk file format represents a virtual hard disk drive and virtual harddisk files can be mounted and used as a regular disk. In the present illustration, backup data storage 110 includes multiple virtual harddisk files 112 containing backup copies of various volume (C:\, D:\, and E:\) backed up from the client devices 102.

In some embodiments, the backup and restore server 106 is implemented using EMC® NetWorker® software module. Furthermore, in some embodiments, the backup data storage 110 is implemented using an EMC® Data Domain® deduplication disk storage system. EMC NetWorker® software module includes an ability to create a full and incremental backup of a target volume by copying all or only changed blocks of the target volume into a virtual harddisk file format. The software module creates a virtual harddisk file stream on the fly which contains all the virtual harddisk related metadata and the disk metadata such as MBR (Master Boot Record), GPT (GUID Partition Table) and the volume contents, which will then be streamed to the backup medium such as tape or disk targets as a single stream. The resulting save set can then be mounted on the client device as regular data volumes for recovery purposes.

With the client devices backed up periodically, the files and data object on the client devices may be restored after a data loss event. However, in some situations, the client device may suffer from a catastrophic failure, such as a hardware failure or a disaster. When the client device is a file server, hardware failures may cause the file server to be out of service with serious impact to business operations. To restore the backup data, a system administrator may mount the virtual harddisk file containing the backup data onto the client device. The system administrator may then select files to be restored manually or perform an image copy back to the source volume. However, the backup data in the virtual harddisk files cannot be mounted onto the client device in the absence of an operating system load. In some situations, the client device may be so damaged that the machine cannot be booted up or the machine no longer has a working operating system. In that case, the system administrator can only restore from the backup copy after he/she repairs the client device, such as by repairing or replacing the failed hardware, and after he/she re-installs the operating system on the client device so that the client device can be booted up. The system administrator often has to re-install the operating system from an operating system CD of the operating system and then has to apply all the service packs and patches to the re-installed operating system. The backup and restore client has to be re-installed on the client device as well and all updates to the backup and restore client may have to be updated before the data recovery from the backup virtual harddisk files can start. This is often a time consuming and burdensome process which leads to a long recovery time.

In some cases, the backup and restore vendor may provide a disaster recovery media, such as on a CD-ROM. The system administrator, after repairing the hardware on the client device, may be able to boot from the disaster recovery media and then initiate restore using the backup and restore client. However, this process still requires the system administration to locate the physical copy of the disaster recovery media.

According to aspects of the present invention, a data recovery method performs instant restore of a physical machine by enabling the physical machine to be booted up from a block based backup data volume over a network connection. In some embodiment, the data recovery method is implemented in a client device that is provided with a network communication interface that is boot capable for supporting network booting, that is, booting of the physical machine over a data network. In some embodiments, the data recovery method is implemented in a client device that provides block level access to network connected devices.

Figure 2:
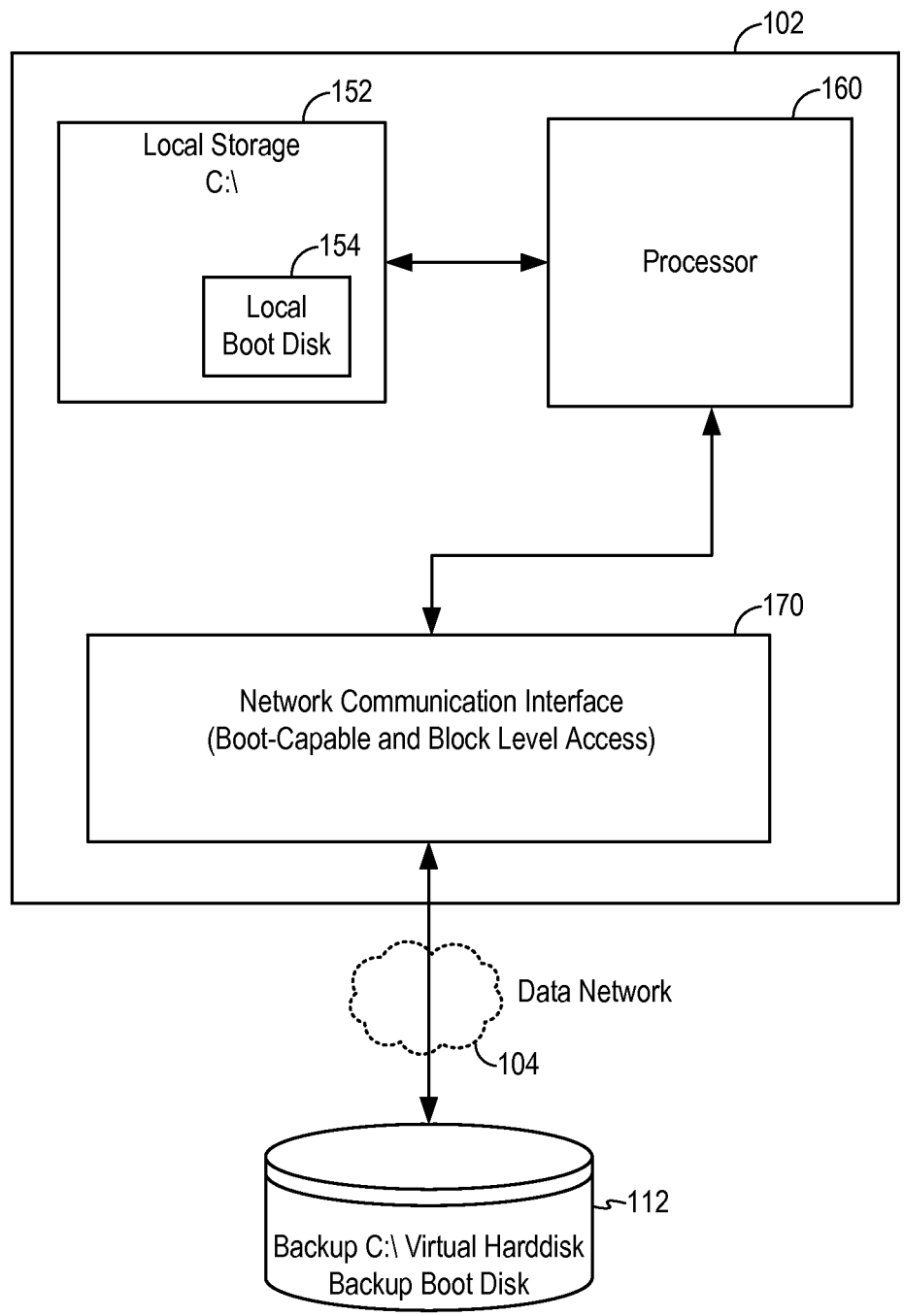
FIG. 2 is a block diagram of a client device implementing the data recovery method according to one embodiment of the present invention.

FIG. 2 is a block diagram of a client device implementing the data recovery method according to one embodiment of the present invention. Referring to FIG. 2, a client device includes a processor 160 in communication with a local storage 152, such as a hard disk drive, and a network communication interface 170. In normal operation, the processor 160 of client device 102 is booted up by accessing the local storage 152 for the sector that is designated as the boot disk 154. However, in the event that the client device suffers from malfunction including damages to or loss of the operating system, the processor 160 is not able to boot up the client device from the local boot disk 154. In that case, the client device 102, implementing the data recovery method of the present invention, connects to the backup and restore server 106, over the data network 104 using the network communication interface 170. In particular, the client device implements a network communication interface 170 that is boot capable for supporting network booting. The data recovery method, when implemented in client device 102, enables the backup data volume on the backup server, such as the virtual harddisk file 112, to be exposed to the processor 160 of the client device 102 as a remotely readable storage resource. In particular, the backup data volume is exposed to the client device 102 as a boot-capable disk and the processor may boot up the client device from the backup data volume 112 over the data network 104. In the present description, booting up the client device refers to loading the operating system into the local memory, such as local storage 152, so that the operating system is ready for user interaction.

In some embodiments, the client device 102 implements the iSCSI network communication interface in the network communication interface. iSCSI, which stands for Internet Small Computer System Interface, is an Internet Protocol (IP) based storage networking interface for linking data storage devices over a data network. In some embodiments, using a non-primary operating system and the iSCSI communication interface, the backup data volume is exposed to the client device as an iSCSI target being the remotely readable storage resource. In the present description, a non-primary operating system refers to a minimal or lightweight operating system that is used when there is no functioning operating system on the physical machine. The non-primary operating system is not intended to be used as the primary operating system of the physical machine. The non-primary operating system can be a preinstallation environment in some examples. The client device, acting as the iSCSI initiator, sends commands over IP to the iSCSI target. iSCSI provides block level network access to the iSCSI target and allows the client device to boot from the iSCSI target being the backup data volume. In some embodiments, the client device 102 implements a boot capable network communication interface to enable the client device to boot from the iSCSI target over the data network. In one embodiment, the network communication interface 170 of the client device 102 is implemented using a PCI-X[3] boot capable network interface card.

Figure 3:
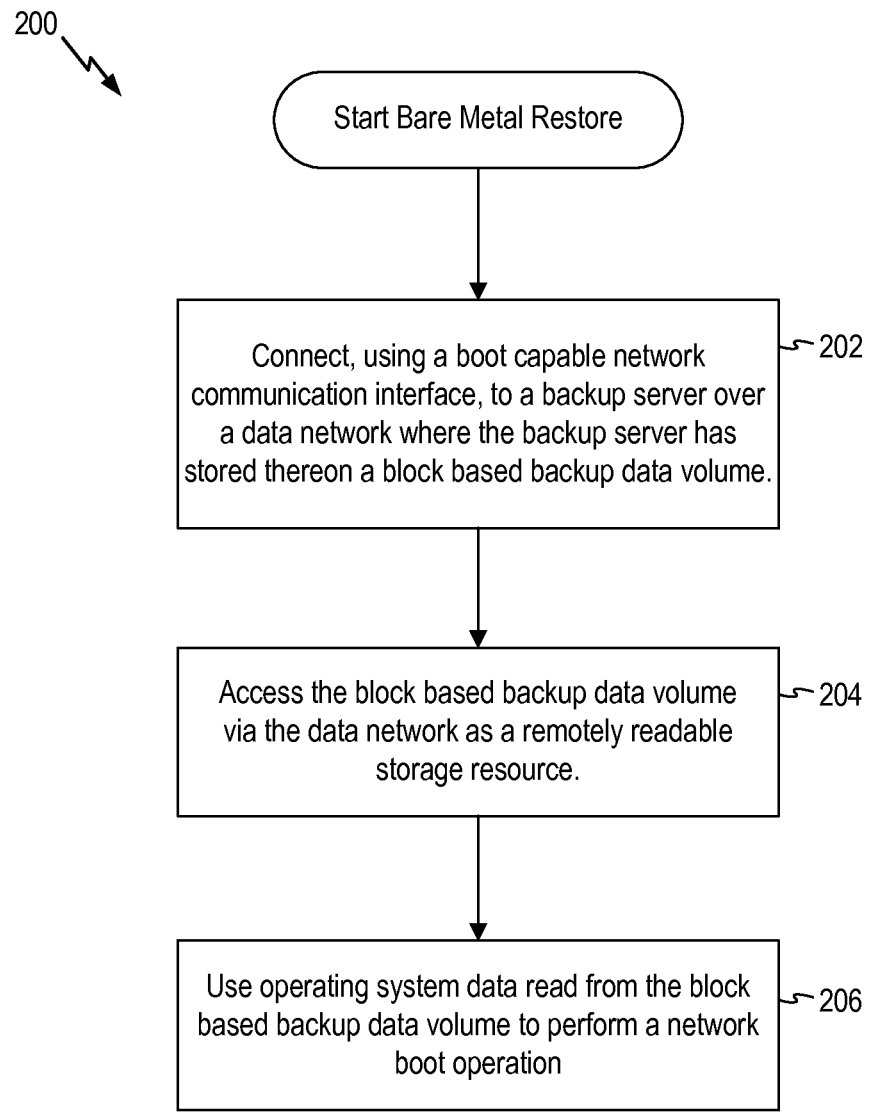
FIG. 3 is a flowchart illustrating an embodiment of the data recovery method to perform instant restore of a physical machine according to one embodiment of the present invention.

FIG. 3 is a flowchart illustrating an embodiment of the data recovery method to perform instant restore of a physical machine according to one embodiment of the present invention. Referring to FIG. 3, the data recovery method 200 is implemented in a client device to restore the client device using backup data after a hardware failure or catastrophic failure and bare metal recovery is needed. That is, the data recovery method 200 restores the physical machine of the client device ("the client machine") to operating condition as opposed to restoring files and data objects that are stored on the physical machine. At the start of data recovery method 200, the client machine is assumed to have suffered hardware failure or suffered from a disaster such that the client machine no longer has a working operating system or cannot be booted up. The hardware of the client machine is repaired and bare metal restore is now needed.

At 202, the data recovery method connects, using a boot capable network communication interface, to a backup server over a data network where the backup server has stored thereon a block based backup data volume. At 204, the data recovery method accesses the block based backup data volume via the data network as a remotely readable storage resource. At 206, the data recovery method uses operating system data read from the block based backup data volume to perform a network boot operation.

In some embodiments, the data recovery method assesses the remotely readable storage resource as a boot-capable data recovery target via the data network. Furthermore, in one embodiment, the boot-capable data recovery target is an iSCSI target.

In some embodiments, the data recovery method receives over the data network a command to connect to the block based backup data volume as a boot-capable data recovery target, and exposes at the backup server the block based backup data volume as the remotely readable storage resource over the data network.

In some embodiments, the data recovery method connects, using a non-primary operating system environment and the boot capable network communication interface, to the backup server over the data network. In one embodiment, the non-primary operating system environment provides file system and networking functions.

In some embodiments, the data recovery method accesses the block based backup data volume as a writeable snapshot. In one embodiment, the data recovery method writes log files generated during the network boot operation to a storage resource designated by the backup server. In yet another embodiment, the data recovery method writes log files generated during the network boot operation to a storage medium connected to the backup server, thereby preventing the backup data volume from being changed or modified.

Figure 4:
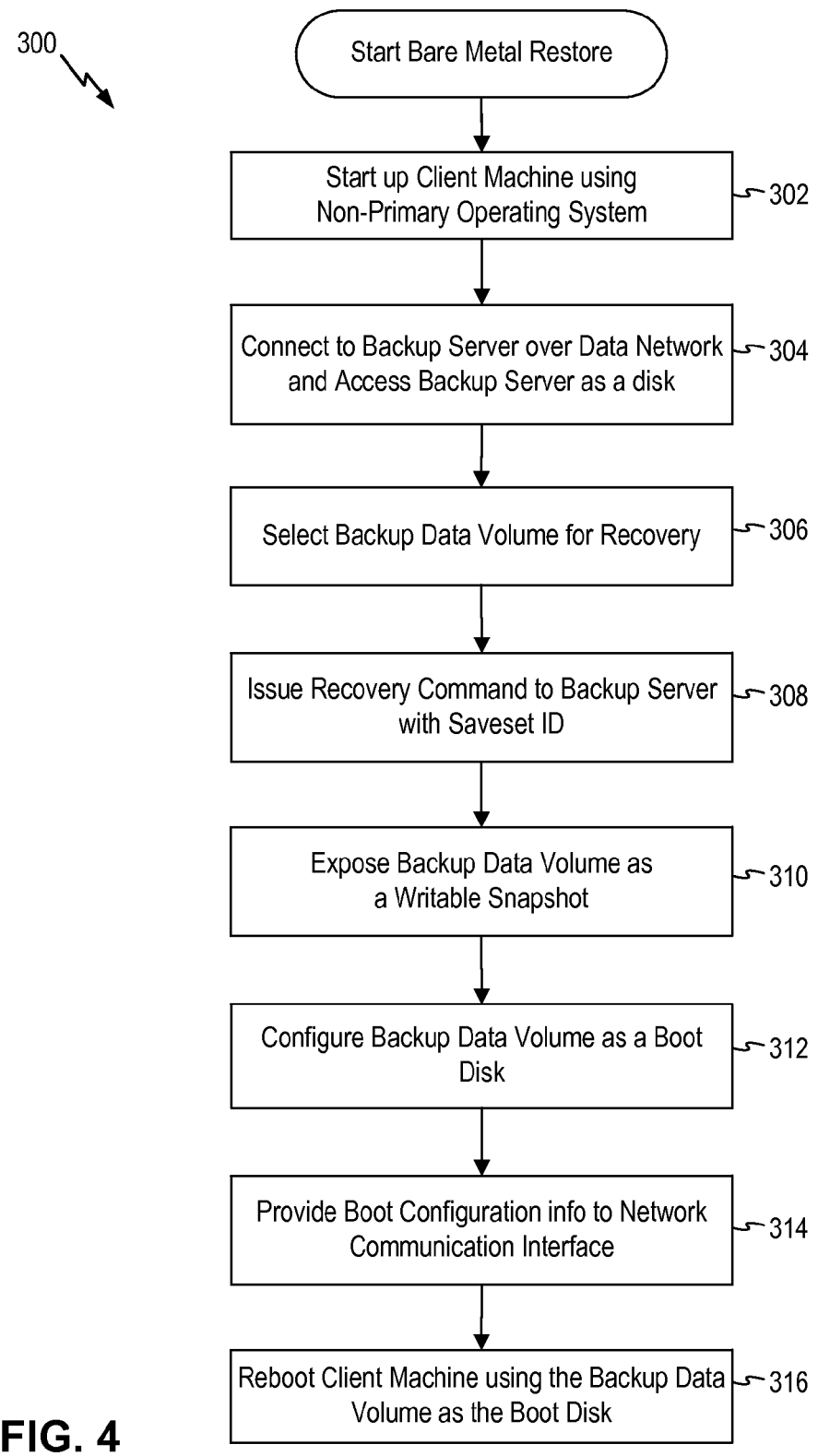
FIG. 4 is a flowchart illustrating an embodiment of the data recovery method to perform instant restore of a physical machine according to an alternate embodiment of the present invention.

FIG. 4 is a flowchart illustrating an embodiment of the data recovery method to perform instant restore of a physical machine according to one embodiment of the present invention. Referring to FIG. 4, the data recovery method 300 is implemented in a client device to restore the client device using backup data after a hardware failure or catastrophic failure and bare metal recovery is needed. That is, the data recovery method 300 restores the physical machine of the client device ("the client machine") to operating condition as opposed to restoring files and data objects that are stored on the physical machine. At the start of data recovery method 300, the client machine is assumed to have suffered hardware failure or suffered from a disaster such that the client machine no longer has a working operating system or cannot be booted up. The hardware of the client machine is repaired and bare metal restore is now needed.

At 302, the client machine is started up using a non-primary operating system, such as a preinstallation environment. In the present description, a non-primary operating system refers to a minimum or lightweight version of an operating system which provides limited functionality on the client machine, such as limited file system functions and networking functions. A preinstallation environment is used when there is no functional operating system. A preinstallation environment is not intended to be used as the primary operating system of the physical machine. In one example, the client machine is started up using Windows PE or WinPE being the Windows® Preinstallation Environment, available from Microsoft Corporation. The WinPE preinstallation environment is provided on the client machine for the deployment of operating system or for troubleshooting an operating system.

At 304, using the non-primary operating system, the client machine connects to a backup server over a data network where the backup server stores block based backup data for the client machine. More specifically, the client machine is connected to the backup server using a network communication interface that is boot-capable and supports network boot over a data network. In this manner, the backup server is exposed as a disk to the client machine. When the backup server is exposed on the client machine as a disk, the backup data volumes stored thereon can be explored as a normal file-system volume using the file-system explorer of the client machine. Furthermore, when the backup server is connected to the client machine using a boot capable network communication interface, the backup data volume will be exposed to the client machine as a boot-capable target.

At 306, the data recovery method selects a backup data volume having the desired backup data for the client machine. At 308, the data recovery method 300 issues a recovery command to the backup server. The recovery command may be sent with the saveset identifier (saveset ID) identifying the backup data volume on the backup server selected for restore.

At 310, the backup data volume is exposed to the client machine as a writable snapshot. When a processor boots up an operating system, the processor is configured to write certain log files to the boot disk as part of the normal boot up processes. When the boot disk is the local disk, the log files are written to the local storage of the client machine. However, when the client machine is being boot up from the backup data volume, the processor must be provided with storage resource to store the log files being generated. In embodiments of the present invention, the backup data volume is exposed to the client machine as a writeable snapshot. However, the client machine does not write to the backup server as it is undesirable to modify or change the backup data stored on the backup data storage. Instead, the backup server provides the processor of the client machine with a designated storage resource to write the log files. The designated storage resource may be a storage device that is daisy chained to the backup server. While the processor of the client machine operates as if it is writing the log files to the backup server as the boot disk, the log files are actually written to the daisy-chained storage device. These log files may be discarded and are not critical to the operation of the client machine.

At 312, the data recovery method 300 configures the selected backup data volume as the boot disk for the client machine. For example, in the Windows® environment, the BCDboot command can be used to specify the backup data volume as the boot disk. At 314, the data recovery method 300 provides boot configuration information to the network communication interface of the client machine. For example, the boot configuration information may be provided to the boot-capable network interface card of the client machine.

At 316, the client machine is rebooted using the backup data volume on the backup server as the boot disk. That is, the operating system data from the backup data volume is read from the backup server and loaded into the local memory of the client machine so that the operating system on the client machine is ready for user interaction. In this manner, the client machine can be booted up and brought up to a certain level of functionality using the backup server within a short recovery time. Importantly, the data recovery method enables a client machine to be restored within a short recovery time and without the need for an operating system CD or a disaster recovery media.

Convectional bare metal recovery often requires the system administrator to bring up the primary operating system first before network-connected backup data can be viewed over the network and files and data objects can be restored. In accordance with the present invention, the data recovery method enables the system administrator to configure the client machine to use the back up data volume as the boot disk so that the client machine can be boot up quickly and the backup data on the backup data storage can be made available to users very quickly. Subsequent to rebooting from the backup data storage, the system administrator may perform other recovery tasks while the backup data for that client machine is made available to the users. For example, there may be multiple versions of the backup data. Once the client machine is brought up, the system administrator may examine the backup data and determine which backup copy should be used to restore the files and data objects on the client machine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing data restore, comprising:
connecting, using a boot capable network communication interface, to a backup server over a data network, the backup server having stored thereon a block based backup data volume;
accessing the block based backup data volume via the data network as a remotely readable storage resource;
using operating system data read from the block based backup data volume to perform a network boot operation; and
after connecting to the backup server, transmitting a recovery command over the data network to the backup server, the recovery command comprising a saveset identifier identifying the block based backup data volume containing the operating system data.

2. The method of claim 1, wherein accessing the block based backup data volume via the data network as the remotely readable storage resource comprises:
accessing the remotely readable storage resource as a boot-capable data recovery target via the data network.

3. The method of claim 1, wherein accessing the block based backup data volume via the data network as a remotely readable storage resource comprises:
accessing the block based backup data volume via the data network as an iSCSI (Internet Small Computer System Interface) target.

4. The method of claim 1, further comprising:
receiving over the data network a command to connect to the block based backup data volume as a boot-capable data recovery target; and
exposing at the backup server the block based backup data volume as the remotely readable storage resource over the data network.

5. The method of claim 1, wherein connecting, using a boot capable network communication interface, to the backup server over the data network comprises:
connecting, using a non-primary operating system environment and the boot capable network communication interface, to the backup server over the data network.

6. The method of claim 5, wherein the non-primary operating system environment provides file system and networking functions.

7. The method of claim 1, wherein accessing the block based backup data volume via the data network as the remotely readable storage resource comprises:
accessing the block based backup data volume as a writeable snapshot.

8. The method of claim 7, further comprising:
writing log files generated during the network boot operation to a storage resource designated by the backup server.

9. The method of claim 8, wherein writing log files generated during the network boot operation to a storage resource designated by the backup server comprises:
writing log files generated during the network boot operation to a storage medium connected to the backup server, thereby preventing the backup data volume from being changed or modified.

10. A system for performing data restore, comprising:
a processor configured to:
connect, using a boot capable network communication interface, to a backup server over a data network, the backup server having stored thereon a block based backup data volume;
access the block based backup data volume via the data network as a remotely readable storage resource;
use operating system data read from the block based backup data volume to perform a network boot operation; and
after connecting to the backup server, transmit a recovery command over the data network to the backup server, the recovery command comprising a saveset identifier identifying the block based backup data volume containing the operating system data; and a memory coupled to the processor and configured to provide the processor with instructions.

11. The system of claim 10, wherein the processor is further configured to:
   access the block based backup data volume via the data network as an iSCSI (Internet Small Computer System Interface) target.

12. The system of claim 10, wherein the processor is further configured to:
   receive over the data network a command to connect to the block based backup data volume as a boot-capable data recovery target; and
   expose at the backup server the block based backup data volume as the remotely readable storage resource over the data network.

13. The system of claim 10, wherein the processor is further configured to:
   writing log files generated during the network boot operation to a storage resource designated by the backup server.

14. The system of claim 13, wherein the processor is further configured to:
   writing log files generated during the network boot operation to a storage medium connected to the backup server, thereby preventing the backup data volume from being changed or modified.

15. A computer program product to perform data restore on a physical machine in the absence of a working operating system, the computer program product being embodied in a tangible, non-transitory computer readable storage medium and comprising computer instructions for:
   connecting, using a boot capable network communication interface, to a backup server over a data network, the backup server having stored thereon a block based backup data volume;
   accessing the block based backup data volume via the data network as a remotely readable storage resource;
   using operating system data read from the block based backup data volume to perform a network boot operation; and
   after connecting to the backup server, transmitting a recovery command over the data network to the backup server, the recovery command comprising a saveset identifier identifying the block based backup data volume containing the operating system data.

16. The computer program product of claim 15, wherein the computer program product further comprises computer instructions for:
   accessing the block based backup data volume via the data network as an iSCSI (Internet Small Computer System Interface) target.

17. The computer program product of claim 15, wherein the computer program product further comprises computer instructions for:
   receive over the data network a command to connect to the block based backup data volume as a boot-capable data recovery target; and
   expose at the backup server the block based backup data volume as the remotely readable storage resource over the data network.

18. The computer program product of claim 17, wherein the computer program product further comprises computer instructions for:
   writing log files generated during the network boot operation to a storage resource designated by the backup server.

19. The computer program product of claim 18, wherein the computer program product further comprises computer instructions for:
   writing log files generated during the network boot operation to a storage medium connected to the backup server, thereby preventing the backup data volume from being changed or modified.

* * * * *